United States Patent
Suma

(10) Patent No.: US 9,824,718 B2
(45) Date of Patent: Nov. 21, 2017

(54) RECORDING AND PLAYBACK DEVICE

(71) Applicant: Panasonic Intellectual Property Management Co., Ltd., Osaka (JP)

(72) Inventor: Toshinari Suma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/849,665

(22) Filed: Sep. 10, 2015

(65) Prior Publication Data
US 2016/0078897 A1    Mar. 17, 2016

(30) Foreign Application Priority Data

Sep. 12, 2014 (JP) ................ 2014-185907
Aug. 20, 2015 (JP) ................ 2015-162410

(51) Int. Cl.
| | | |
|---|---|---|
| G11B 20/10 | (2006.01) | |
| H04N 9/87 | (2006.01) | |
| H04N 5/91 | (2006.01) | |
| H04N 5/77 | (2006.01) | |

(52) U.S. Cl.
CPC ......... *G11B 20/10527* (2013.01); *H04N 5/77* (2013.01); *H04N 5/772* (2013.01); *H04N 5/91* (2013.01); *G11B 2020/10537* (2013.01)

(58) Field of Classification Search
CPC ........ G11B 20/00086; G11B 20/00528; G11B 20/00855; G11B 20/00688; G11B 20/10527; H04N 5/91; H04N 5/232; H04N 21/4627; H04N 21/8355
See application file for complete search history.

(56) References Cited

U.S. PATENT DOCUMENTS

| | | | |
|---|---|---|---|
| 6,798,975 B1* | 9/2004 | Fukushima | ............ H04N 5/772 386/224 |
| 2004/0139469 A1 | 7/2004 | Incentis Carro | |
| 2004/0193606 A1 | 9/2004 | Arai et al. | |
| 2006/0041596 A1 | 2/2006 | Stirbu et al. | |
| 2007/0055842 A1 | 3/2007 | Abe et al. | |
| 2009/0238539 A1* | 9/2009 | Isobe | .................. G11B 27/034 386/248 |
| 2009/0285118 A1 | 11/2009 | Yoshikawa et al. | |

(Continued)

FOREIGN PATENT DOCUMENTS

| | | |
|---|---|---|
| JP | 11-018058 | 1/1999 |
| JP | 2004-192601 | 7/2004 |
| JP | 2005-100518 | 4/2005 |

(Continued)

*Primary Examiner* — Huy T Nguyen
(74) *Attorney, Agent, or Firm* — Wenderoth, Lind & Ponack, L.L.P.

(57) ABSTRACT

The recording and playback device includes a recording unit configured to record AV data on a recording medium as an AV data file, a file management unit configured to provide an access system depending on a use to the AV data file, an updating unit configured to update file information about access restrictions on the AV data file depending on the access system being provided depending on a use, based on a rule associated with the access system, and a communication unit configured to open the AV data relating to the updated file information to the outside.

11 Claims, 7 Drawing Sheets

(56) References Cited

U.S. PATENT DOCUMENTS

2010/0205370 A1* 8/2010 Ikawa .................. G06F 3/0625
711/114
2011/0252323 A1* 10/2011 Kobayashi ....... G11B 20/00086
715/716

FOREIGN PATENT DOCUMENTS

| | | |
|---|---|---|
| JP | 2006-013996 | 1/2006 |
| JP | 2007-072672 | 3/2007 |
| JP | 2007-184892 | 7/2007 |
| JP | 2008-510244 | 4/2008 |
| JP | 2008-276376 | 11/2008 |
| JP | 2009-070011 | 4/2009 |
| JP | 2010-005159 | 1/2010 |
| JP | 2010-016748 | 1/2010 |
| JP | 2011-139537 | 7/2011 |
| JP | 2012-208846 | 10/2012 |
| WO | 2006/018717 | 2/2006 |

* cited by examiner

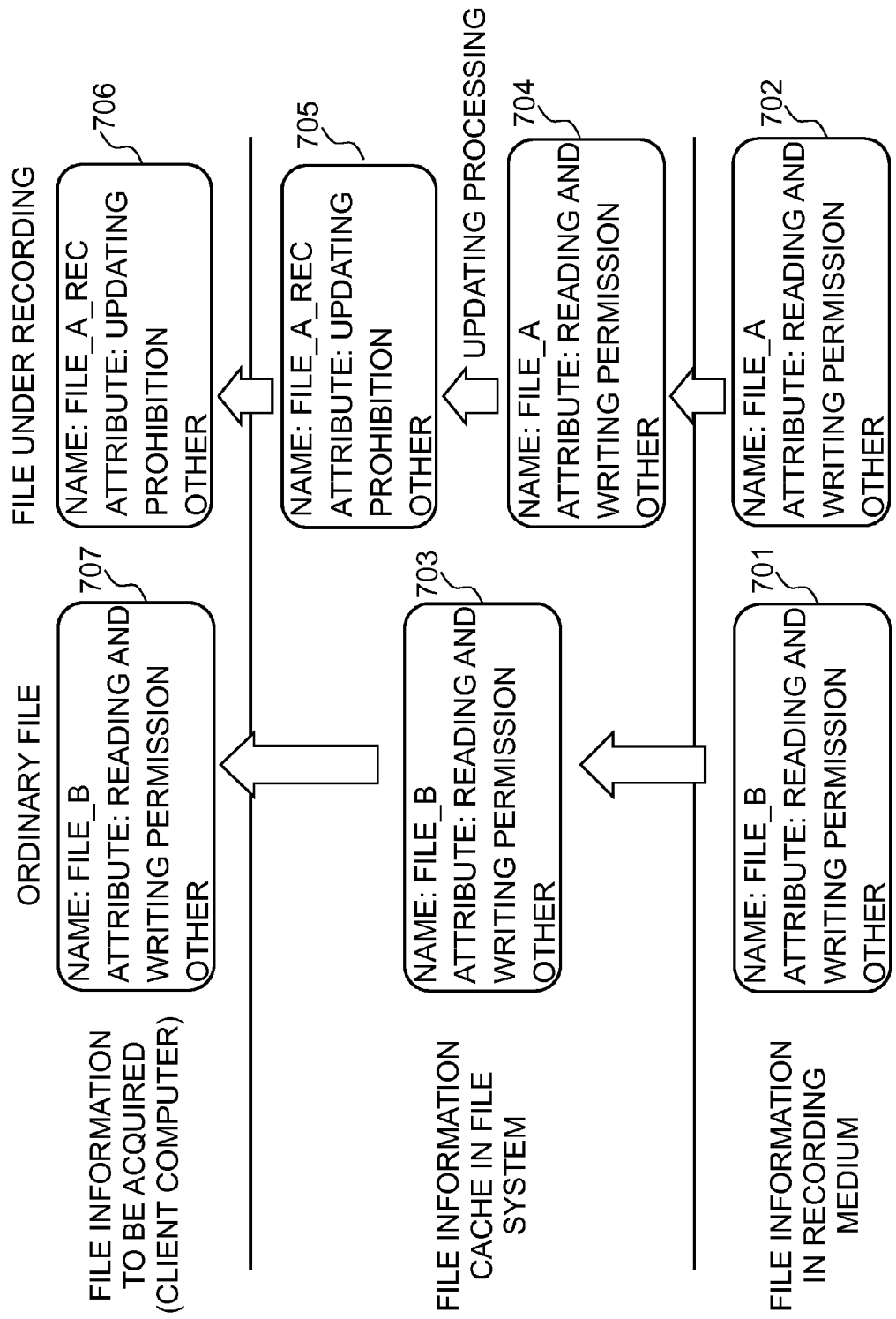

RECORDING AND PLAYBACK DEVICE

BACKGROUND OF THE INVENTION

1. Field of the Invention

The present disclosure relates to a recording and playback device including a file management system capable of setting access restrictions on a specific file.

2. Description of the Related Art

Unexamined Japanese Patent Publication No. 2012-208846 discloses a method of performing access control on a storage device having large target space in a shared file system. Specifically, a meta data server notifies the client and the storage device of the access range depending on the client by using the access range and the client identification key for identifying the client. This enables the client to make access only to the permitted range of the storage device.

SUMMARY OF THE INVENTION

The present disclosure provides a recording and playback device capable of setting access restrictions on a specific file depending on a use.

The recording and playback device in the present disclosure includes a recording unit, a file management unit, an updating unit, and a communication unit. The recording unit is configured to record AV data on a recording medium as an AV data file. The file management unit is configured to provide an access system depending on a use to the AV data file. The updating unit is configured to update file information about access restrictions on the AV data file depending on the access system being provided depending on a use, based on a rule associated with the access system. The communication unit is configured to open the AV data relating to the updated file information to the outside.

The recording and playback device in the present disclosure can set access restrictions on a specific file depending on a use. Therefore, for example, it is effective to protect the file under recording or playback while permitting access from the outside to the recording medium under recording or playback.

BRIEF DESCRIPTION OF DRAWINGS

FIG. 7 is a conceptual diagram for illustrating the file-information updating operation in a cache of the recording and playback device in the first exemplary embodiment.

DETAILED DESCRIPTION OF THE PREFERRED EMBODIMENTS

In the following, exemplary embodiment will be described in detail with reference to the accompanying drawings appropriately. However, a detailed description more than necessary may not be given. For example, a detailed description of the already well-known matters and a substantially overlapping description for the same configuration may not be given. This is to avoid that the following description is unnecessarily redundant, and is to facilitate the understanding of those skilled in the art.

It should be noted that the accompanying drawings and the following description are provided so that those skilled in the art fully understand the present disclosure, and that it is not intended to limit the subject matter described in the claims by these.

First Exemplary Embodiment

In the following, the first exemplary embodiment will be described with reference to FIGS. 1 to 7.

[1-1. Configuration]

[1-1-1. Network Connection Configuration]

Figure 1:
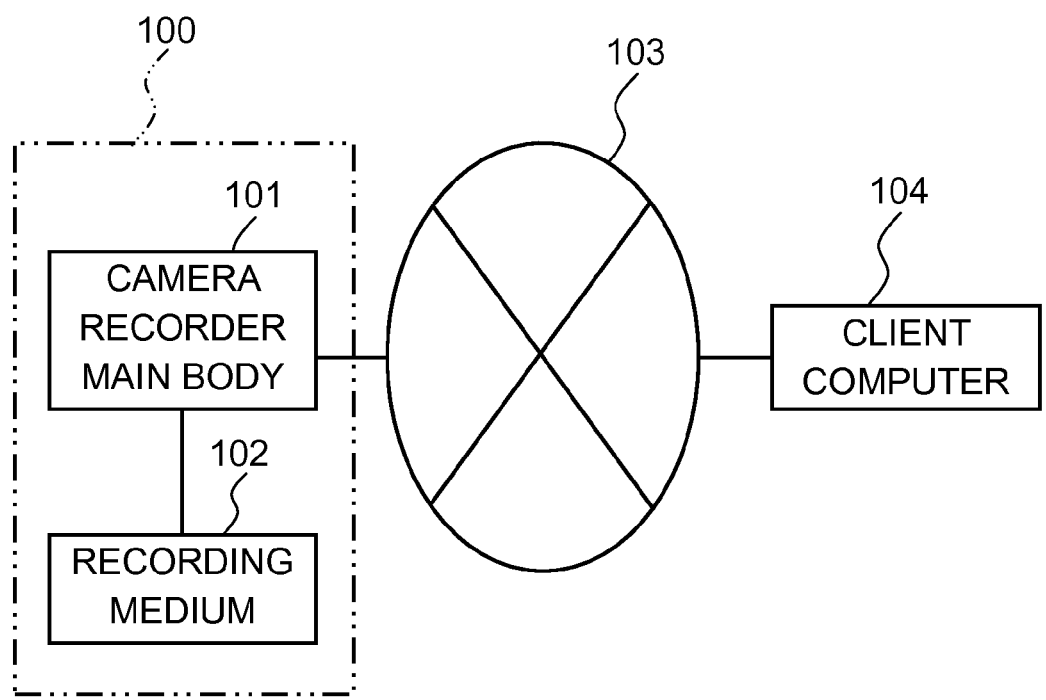
FIG. 1 is a schematic diagram illustrating a state when a recording and playback device in a first exemplary embodiment is connected to a network.

FIG. 1 is a schematic diagram illustrating a state when a recording and playback device according to the first exemplary embodiment is connected to a network. It should be noted that here a camera recorder will be described as an example as the recording and playback device.

Camera recorder 100 has a server function, and can be communicated from client computer 104 through network 103. The Internet may be utilized as network 103.

Recording medium 102 can hold AV data generated by main body 101 of camera recorder 100 as a file. It should be noted that recording medium 102 may be detachable or may not be detachable to main body 101 of camera recorder 100.

Client computer 104 is capable of operations such as acquisition, updating, and deleting on the AV (Audio/Visual) data file held in recording medium 102 by being connected to camera recorder 100 having a server function through network 103. In addition, client computer 104 may be able to record the data being held onto recording medium 102 through network 103.

[1-1-2. Configuration of Recording and Playback Device]

Figure 2:
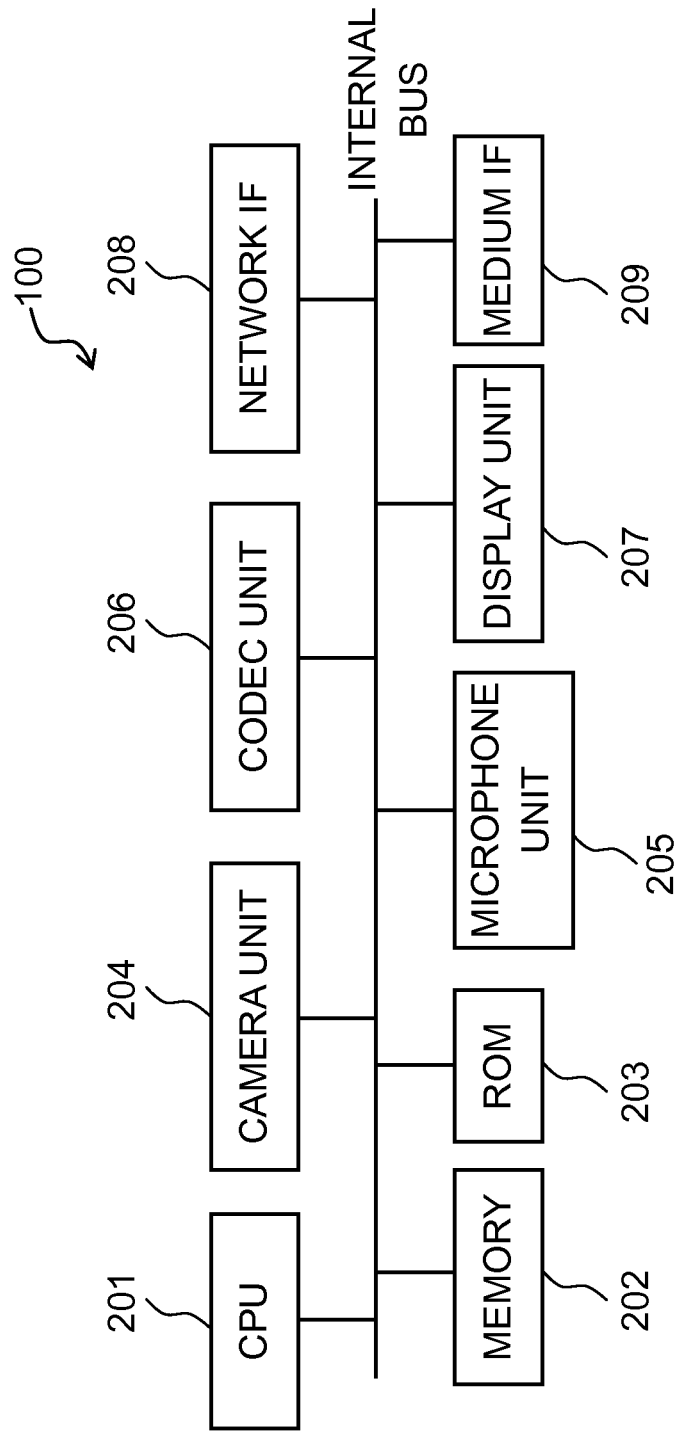
FIG. 2 is a block diagram illustrating a configuration of the recording and playback device in the first exemplary embodiment.

FIG. 2 is a block diagram illustrating a configuration of camera recorder 100. Camera recorder 100 includes, as components, CPU 201, memory 202, ROM 203, camera unit 204, microphone unit 205, codec unit 206, display unit 207, network IF 208, and medium IF 209. Between each of the components, the components are connected to each other through an internal bus.

Camera unit 204 is an imaging unit configured to image a subject image to generate AV data. Codec unit 206 includes a LSI (Large-Scale Integration), encodes AV data such as video data generated by camera unit 204 and audio data generated by microphone unit 205, and generates encoded AV data. CPU 201 is a recording unit configured to store the encoded AV data in recording medium 102 through medium IF 209 as an AV data file.

The file system is part of functions of an OS (Operating System), and is implemented as software. At the start of camera recorder 100, an OS image is expanded from ROM 203 into memory 202, and CPU 201 reads the expanded OS image to execute, whereby OS functions operate, and a function of the file system included in it is also implemented. In addition, when accessing recording medium 102, the file system makes access via a device driver of medium IF 209. The device driver is also implemented by software.

In addition, the file system provides a specific AV data file recorded on recording medium 102 with an access system depending on a use which will be described below. Specifically, an application operating on an OS specifies reference medium information and a mount directory to a file system, whereby a mount path is set. Thus, a mount path is set on a file system by an application, whereby the provision of an access system by the file system for the mount path being set is achieved. CPU 201 is also a file management unit configured to provide a specific AV data file recorded on recording medium 102 with an access system depending on a use.

Furthermore, the file system updates the file information of the AV data file depending on a plurality of access systems being provided depending on a use, based on a rule associated with the access system described below. Here, the file information is the information about access restrictions on the AV data file. CPU 201 is also an updating unit configured to perform an update such as setting the file information to an access restriction state in memory 202 to be a cache memory.

Furthermore, CPU 201 is also a communication unit configured to open the AV data relating to the file information updated in memory 202 to the outside through network IF 208.

When client computer 104 acquires an AV data file recorded on recording medium 102, the AV data file is expanded from recording medium 102 into memory 202 through medium IF 209 as a cache. Client computer 104 reads the expanded AV data file from network 103 through network IF 208.

CPU 201 manages the AV data recorded on recording medium 102 connected through medium IF 209. That is, when the file information of recording medium 102 is referred to from client computer 104 connected through network IF 208, CPU 201 expands the file information recorded on recording medium 102 in memory 202. Then, CPU 201 updates a file name and a file attribute of the file information in memory 202 depending on the operating state of camera recorder 100. Thereby, a file under recording or playback can be protected from the file operation of client computer 104.

[1-1-3. Access System Configuration Depending on a Use of Recording Medium]

Figure 3:
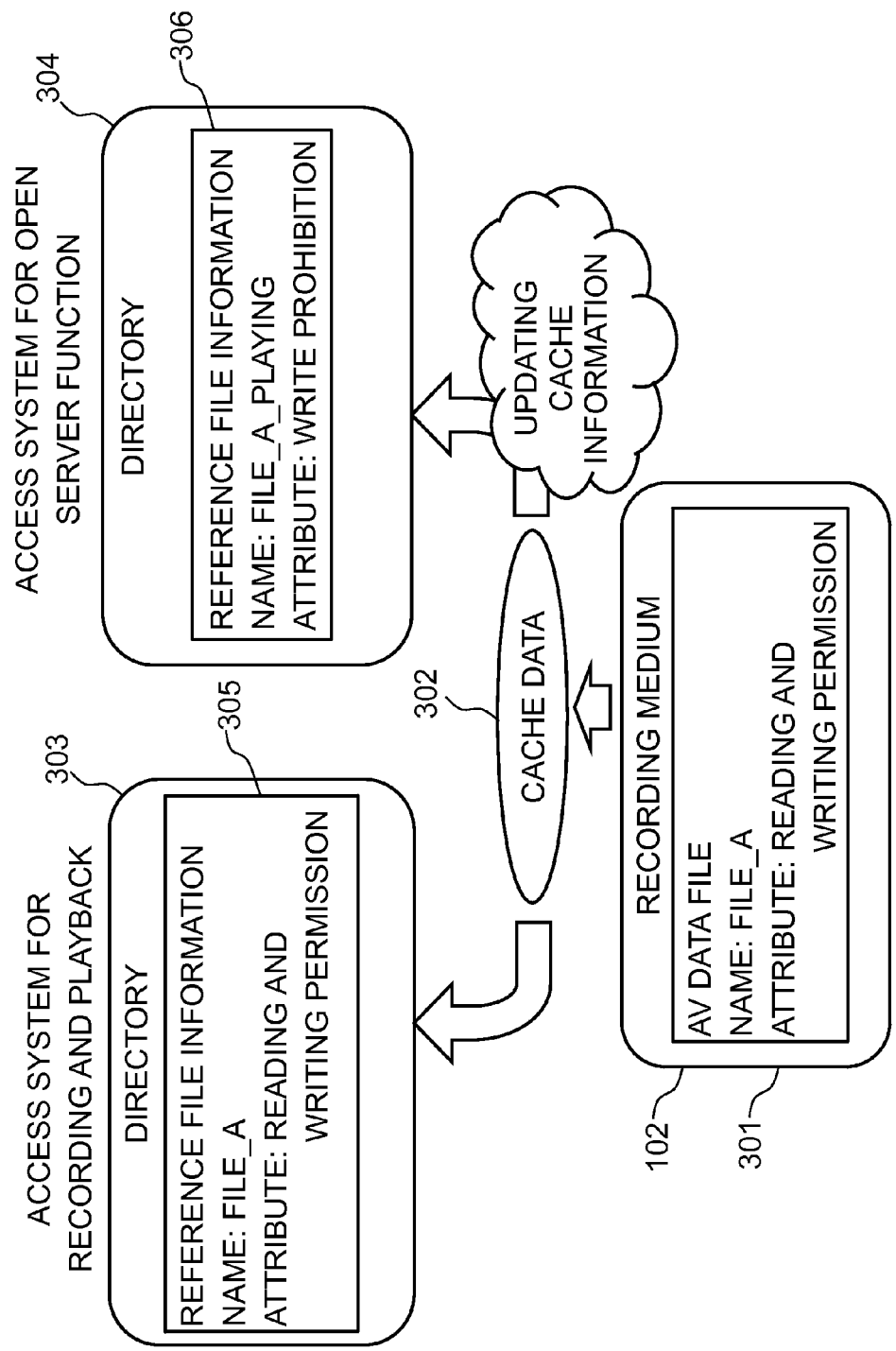
FIG. 3 is a conceptual diagram for illustrating an access system depending on a use of the recording and playback device and the file information associated with the access system in the first exemplary embodiment.

FIG. 3 is a conceptual diagram for illustrating the access system depending on a use of camera recorder 100 and the file information associated with it, and shows a configuration of a plurality of access systems provided depending on a use to recording medium 102 connected to camera recorder 100.

In FIG. 3, a file name of AV data file 301 recorded on recording medium 102 is set as, for example, "FILE_A", and a file attribute is set as, for example, "reading and writing permission".

In a common camera recorder, one access system is provided as reading and writing uses of an AV data file. However, the recording and playback device of the present disclosure provides a plurality of access systems depending on a use. Specifically, camera recorder 100 of the present exemplary embodiment provides an access system for recording and playback and an access system for open server function. The access system for recording and playback is used when camera recorder 100 records the AV data input from camera unit 204 and microphone unit 205 as AV data file 301, and reads recorded AV data file 301 to play back on display unit 207. The access system for open server function is opened to network 103 to be used as a server function use.

Here, the mount path associated with recording medium 102 as the access system for recording and playback is set as directory 303, and the mount path associated with the recording medium as the access system for open server function is set as directory 304.

When acquiring AV data file 301 from recording medium 102 for recording and playback use, main body 101 of camera recorder 100 expands AV data file 301 from recording medium 102 in memory 202 as cache data 302. Then, the expanded AV data file is acquired via the mount directory. Here, file information 305 indicates reference file information contained in the acquired AV data file, and the file name and file attribute of the file information 305 are the same as the file name and file attribute of AV data file 301.

When client computer 104 acquires AV data file 301 from recording medium 102 by using the server function, the file system expands AV data file 301 in memory 202 as cache data 302 first. Here, depending on the operating state of camera recorder 100 (in case under recording or playback) on AV data file 301 of the acquisition target, the file system updates the file name and the file attribute of file information 306 in the cache data. This update target may be changed depending on the use.

In case of the present exemplary embodiment, it is an object to protect an AV data file under recording and playback from client computer 104 in camera recorder 100 during server function operation. Then, as a rule associated with the access system, the file name and the file attribute are changed as follows. Specifically, a string indicating "under playback" or "under recording" is added to the file name as "FILE_A_PLAYING" or "FILE_B_RECORDING", whereby it is indicated to client computer 104 that a specific file is under recording or playback. Thereby, the client using client computer 104 can visually recognize that the AV data file to be acquired is under recording or playback, and therefore can grasp that the AV data file is in a situation where the AV data file should not be updated nor deleted. In addition, the file attribute under playback or recording is updated from the "reading and writing permission" or "accessing permission" to "writing prohibition" in the cache, whereby the AV data file under recording or playback can be prevented from being unexpectedly updated or deleted from the outside.

As described above, the file system provides the access system for recording and playback and the access system for open server function as an access system depending on a use to a specific AV data file in camera recorder 100 including a server function. In addition, the file system prohibits at least the writing on the file information of the AV data file when setting the access restrictions on the access corresponding to the access system for open server function based on a rule associated with the access system.

[1-1-4. Directory Configuration]

Figure 4:
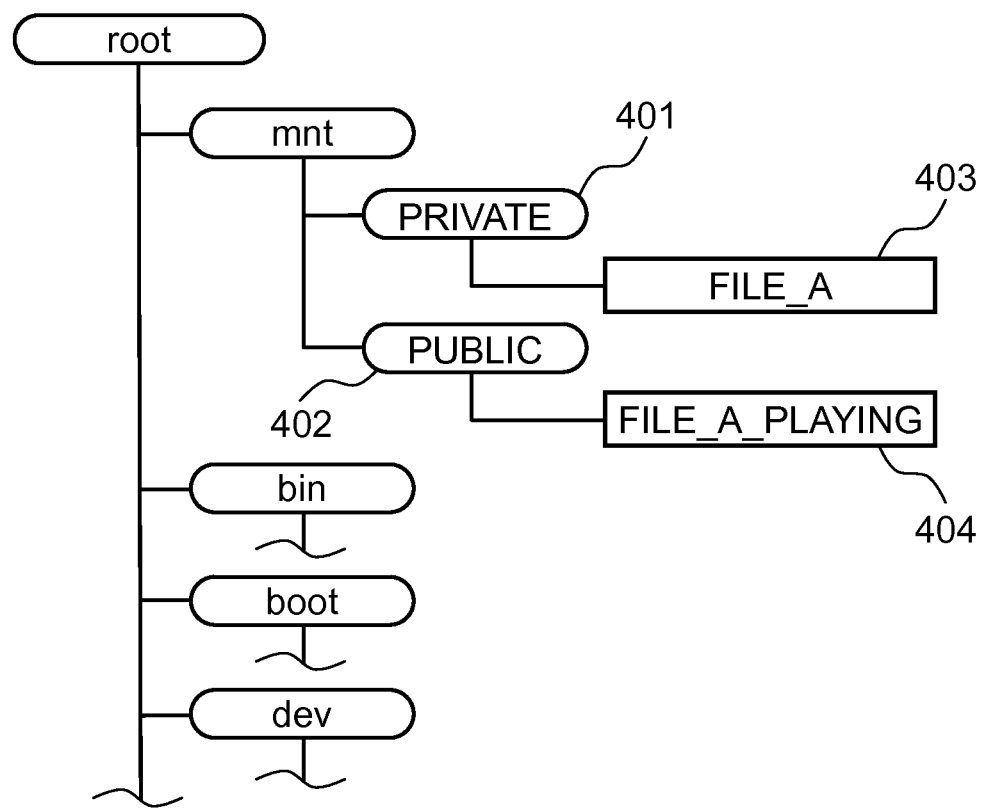
FIG. 4 is a directory configuration diagram showing a directory to which the access system depending on a use of the recording and playback device in the first exemplary embodiment is assigned.

FIG. 4 is a directory configuration diagram showing the directory where the access system depending on a use of camera recorder 100 is assigned, and shows a directory configuration for the OS operating in camera recorder 100 to manage the access system of recording medium 102 depending on a use. When mounting recording medium 102 to a specific directory as means of setting it to a state referable from the OS, camera recorder 100 provides mount directory PRIVATE 401 for a recording and playback use and mount directory PUBLIC 402 for open server function.

When recording an AV data file on recording medium 102, camera recorder 100 writes the AV data file to PRI- VATE 401 directory. In addition, when recording the AV data file on recording medium 102 via the server function mounted in camera recorder 100, camera recorder 100 writes the AV data file to PUBLIC 402 directory opened for the network. The file information referred to via PUBLIC 402 directory dynamically changes depending on the operating state of camera recorder 100. For example, AV data file 403 and AV data file 404 are obtained by the same AV data file in recording medium 102 being referred to via different mount directories. However, when camera recorder 100 is in a playback operation, and when AV data file 404 is referred to via PUBLIC 402 directory, the file name is displayed as "FILE_A_PLAYING". When the playback operation is stopped, the display returns from "FILE_A_PLAYING" to "FILE_A".

[1-2. Operation]

The operation of camera recorder 100 configured as described above will be described in the following.

[1-2-1. Operation Flow on a File System During File Reference]

Figure 5:
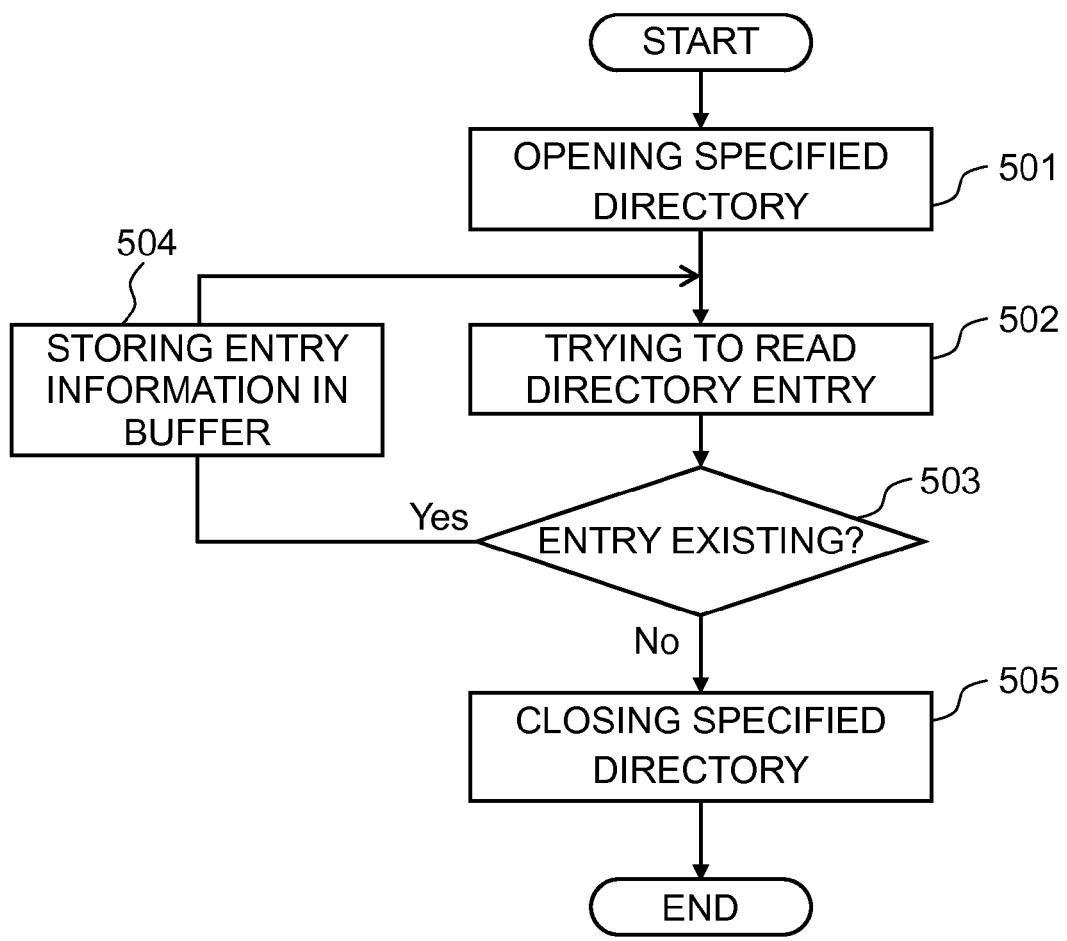
FIG. 5 is a flow chart for illustrating the operation on the file system during the file reference of the recording and playback device in the first exemplary embodiment.

FIG. 5 is a flow chart for illustrating an operation on a file system of camera recorder 100 during the file reference, and shows an operation flow on the file system when access occurs from the outside to the mount directory for open server function.

The case when client computer 104 accesses through network 103 an opened directory of recording medium 102 connected to camera recorder 100 and acquires the file information will be described. First, in step 501, client computer 104 runs some commands on the file system that mounts recording medium 102 via the server function system mounted in camera recorder 100. Specifically, client computer 104 runs open commands by specifying the directory to be referred to. Then, in step 502, the reading of a file stored in the directory and a directory entry where information of the subdirectory is written is tried on the opened directory. Here, if the entry to be read does not exist (step 503), it can be determined that there is no files nor subdirectories in the directory, and therefore the opened specified directory is closed (step 505), and the reference operation on the file system is finished.

In addition, the reading of the directory entry is tried (step 502), and if the entry to be read exists (step 503), the read entry information is stored in a buffer in step 504. Then, the trial of reading a subsequent directory entry (step 502) is repeatedly executed until a subsequent entry disappears. This series of steps enables client computer 104 to acquire a file or directory information stored in the specified directory from the file system.

Figure 6:
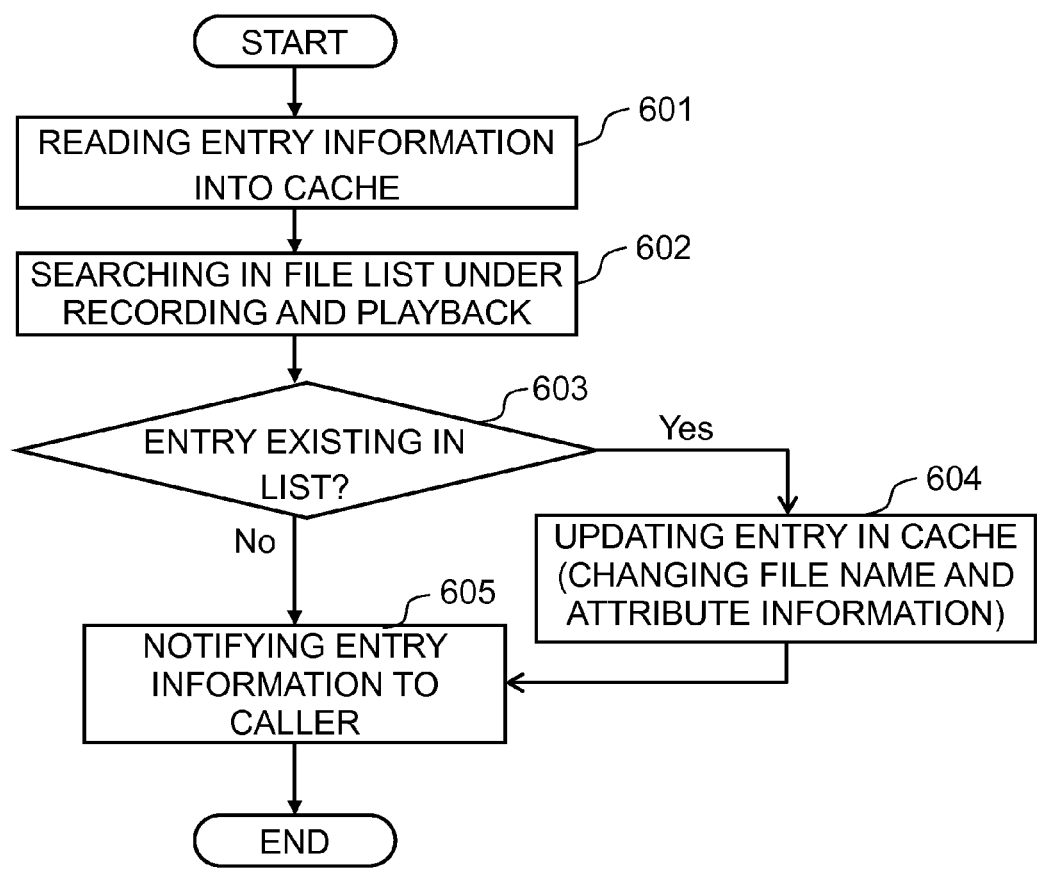
FIG. 6 is a flow chart for illustrating the operation during the directory entry reading in the file system of the recording and playback device in the first exemplary embodiment.

FIG. 6 is a flow chart for illustrating the operation during the directory entry reading in the file system of camera recorder 100.

As shown in FIG. 5, client computer 104 tries to read the directory entry in response to the directory entry read command on the file system that mounts recording medium 102 via the server function system (step 502). An operation flow of the processing performed in the file system in that case is shown in FIG. 6.

Assuming that the trial of reading the directory entry (step 502) is performed from client computer 104, then, the file system performs the reading of the entry information on recording medium 102 in step 601, and holds the read entry information in the cache (memory 202). Then, in step 602, a search is performed whether the same file as the entry information held in the cache exists in a list where the file under recording and playback managed by the file system is registered.

The recording and playback control system of the recording and playback device notifies the file system of the information of the file to be used in recording or playback at the start and the stop of the recording and playback operation as a change time of recording and playback operating state of the recording and playback device, whereby this list is updated. This list is managed by the inside of the file system, and a file existing in this list can be determined to be under recording or playback in the recording and playback device.

In step 603, as a result of the search in step 602, it is determined whether the entry read in the cache exists in the list under recording and playback. As a result, if it is determined that the entry read in the cache does not exist in the list, the file system notifies a caller of the entry information read in the cache as it is (step 605).

As a result of the search in step 603, if the entry read in the cache is determined to exist in the list under recording and playback, for example, the file system updates the entry information in the cache depending on a use as described in FIG. 3 (step 604). Due to the updating processing, the file reference information under recording or playback can be optionally changed by being limited to a specific access system.

[1-2-2. File Reference Information Updating Operation]

FIG. 7 is a conceptual diagram for illustrating the file information updating operation in the cache of the recording and playback device. The flow where the file information held in recording medium 102 changes depending on the operating state of camera recorder 100 will be described with reference to FIG. 7.

If camera recorder 100 is under recording and playback operation stop, the file information 701 held in recording medium 102 is to be held as cache 703 in the file system, and then to be notified to the caller as file information 707. In this case, file information 701 held by recording medium 102 and file information 707 notified to the caller match.

On the other hand, if camera recorder 100 is under recording and playback operation, the file information 702 held in recording medium 102 is to be held as cache 704 in the file system. Subsequently, the file information of the file determined to be included in the list under recording and playback in the file system is updated to file information 705 in the cache. In the case of the present exemplary embodiment, the file name is updated from "FILE_A" to "FILE_A_REC", and the file attribute is updated from "reading and writing permission" to "update prohibition". Subsequently, file information 705 is notified to the caller as the acquisition result. Thus, the AV data file under recording and playback in camera recorder 100 is recognized by client computer 104 having performed a reference to file information 705 as the AV data file on which the updating processing cannot be performed. That is, the AV data file under recording and playback is recognized as the AV data file on which the updating processing cannot be performed, unlike the AV data file in a state of being recorded on the recording medium and the AV data file referred to by another mount path.

[1-3. Effect, Etc.]

As described above, in the present exemplary embodiment, when client computer 104 refers to the file information of recording medium 102 through the network, the file information can be dynamically changed depending on the operating state of camera recorder 100 regardless of the file information in recording medium 102. Therefore, a file under recording and playback can be protected from an inadvertent update. Thereby, the recording and playback operation of the main body of camera recorder 100 can be stably continued.

Other Exemplary Embodiments

As described above, the first exemplary embodiment is described as an example of the technology disclosed in the present application. However, the technology in the present disclosure is not limited to this, and can also be applied to the exemplary embodiments where changes, substitutions, additions, omission, and the like are performed. In addition, it is also possible to combine each of the components described in the first exemplary embodiment into a new exemplary embodiment.

Therefore, in the following, other exemplary embodiments will be illustrated.

Although camera recorder 100 is described as an example as the recording and playback device in the first exemplary embodiment, the recording and playback device is not limited to this, and may be implemented as the recorder where camera unit 204 and microphone unit 205 are omitted. In addition, when the encoding and decoding processing is achieved by software, CPU 201 may be used, and therefore codec unit 206 may be omitted.

Although camera unit 204 of the camera recorder is described as an example of the imaging unit in the first exemplary embodiment, the imaging unit may be anything capable of generating the AV data. Therefore, the imaging unit is not limited to the camera unit. In addition, an AV data external input device may be used as the imaging unit.

The present disclosure is applicable to a recording and playback device being network accessible from the outside. Specifically, the present disclosure is applicable to a camera recorder, a video deck, a digital still camera, and the like.

What is claimed is:

1. A recording and playback device comprising:
   a recording unit configured to record AV data on a recording medium as an AV data file;
   a file management unit configured to provide a first access system for a first use of the AV data file and a second access system for a second use of the AV data file, the second use being different from the first use;
   an updating unit configured to update file information regarding access restrictions to the AV data file when the AV data file is accessed via the second access system, based on a rule associated with the second access system, the access restrictions to the AV data file for the second access system being different from access restrictions to the AV data file for the first access system; and
   a communication unit configured to open the AV data relating to the updated file information to an outside via the second access system,
   wherein the file management unit prohibits the file information from being written when the AV data file is accessed via the second access system.

2. A recording and playback device comprising:
   a recording unit configured to record AV data on a recording medium as an AV data file;
   a file management unit configured to provide an access system depending on a use to the AV data file;
   an updating unit configured to update file information about access restrictions on the AV data file depending on the access system being provided depending on a use, based on a rule associated with the access system; and
   a communication unit configured to open the AV data relating to the updated file information to an outside,
   wherein the file management unit prohibits the file information from being written,
   the access system depending on a use includes an access system for recording and playback and an access system for server function,
   for the access system for recording and playback, a mount path for a specific AV data file is provided,
   for the access system for server function, another mount path for the specific AV data file is provided,
   the file management unit at least prohibits the file information from being written when setting access restrictions on the access via the other mount path, and
   the access system depending on a use is implemented by a mount path being set depending on a use.

3. The recording and playback device according to claim 2, wherein when the specific AV data file is under recording or playback, a file attribute of the file information is set to any one of accessing prohibition, updating prohibition, and deleting prohibition.

4. A recording and playback device comprising:
   a recording unit configured to record AV data on a recording medium as an AV data file;
   a file management unit configured to provide an access system depending on a use to the AV data file;
   an updating unit configured to update file information about access restrictions on the AV data file depending on the access system being provided depending on a use, based on a rule associated with the access system; and
   a communication unit configured to open the AV data relating to the updated file information to an outside,
   wherein the access system depending on a use is implemented by a mount path being set depending on a use, and
   when the specific AV data file is under recording or playback, a file name of the file information is set to a name indicating under recording or playback.

5. The recording and playback device according to claim 2, wherein when the specific file is under recording or playback, a change of a file attribute and a file name of the file information is made in a cache.

6. The recording and playback device according to claim 2, further comprising an imaging unit configured to generate AV data by imaging a subject image.

7. The recording and playback device according to claim 1, wherein the first access system is implemented by a first mount path being set depending on the first use, and
   the second access system is implemented by a second mount path being set depending on the second use.

8. The recording and playback device according to claim 7, wherein
   the first use includes recording and playback, and the second use includes a server function,
   when the first access system is used for recording and playback, a mount path for a specific AV data file is provided as the first mount path,
   when the second access system is used for the server function, another mount path for the specific AV data file is provided as the second mount path, and
   the file management unit at least prohibits the file information from being written when setting access restrictions on the access via the second mount path.

9. The recording and playback device according to claim 8, wherein when the specific AV data file is under recording or playback, a file attribute of the file information is set to any one of accessing prohibition, updating prohibition, and deleting prohibition.

10. The recording and playback device according to claim 8, wherein when the specific file is under recording or playback, a change of a file attribute and a file name of the file information is made in a cache.

11. The recording and playback device according to claim 1, further comprising an imaging unit configured to generate AV data by imaging a subject image.

* * * * *